United States Patent Office 2,968,672
Patented Jan. 17, 1961

2,968,672

POLYISOCYANATES CONTAINING TERTIARY AMINE STRUCTURE

Salim N. Ephraim, Forest Hills, N.Y., assignor to Reichhold Chemicals, Inc., Detroit, Mich.

No Drawing. Filed Mar. 19, 1957, Ser. No. 646,972

4 Claims. (Cl. 260—472)

This invention relates to new polyisocyanate compositions and method of making the same. More particularly it relates to modifying simple isocyanates into more complex isocyanates having improved properties and a wider range of applicability.

A class of compounds known to the chemical science as isocyanates have received much industrial interest in the last decade. These compounds have been successfully applied in the manufacture of thermoplastic and thermosetting resins, elastomers, rigid and flexible foams, adhesives, surface coatings and many other useful products. In these applications certain isocyanates are preferred to others from the standpoint of their rate of reaction with a given substrate, their functionality and their state of matter.

By the term "isocyanate" is here meant any chemical compound containing one or more groups with the plurality —N=C=O.

The term "functionality" of a given isocyanate pertains herein to the number of groups with the plurality —N=C=O that are present in a molecule of said isocyanate. Molecules containing one, two, three, or four groups with the pulrality —N=C=O will be considered herein as mono-, di-, tri-, and tetrafunctional isocyanates respectively. The term "polyfunctional" is normally used to characterize molecules having more than two reactive groups. Accordingly, the term polyfunctional isocyanate is considered herein in characterizing chemical molecules having more than two groups with the plurality —N=C=O.

These isocyanates, particularly the difunctional and polyfunctional isocyanates are known to react with organic substances bearing one or more reactive hydrogen atoms to yield valuable products. By reactive hydrogen is meant here a hydrogen atom that is detected and determined by the Zerewitinoff method.

A number of the mono- and diisocyanates are in the liquid state at room temperature. Due to the ease of handling and uniformity of reactions it is desirable to use a liquid isocyanate in several applications. In the case of some applications, however, a liquid isocyanate is essential. Moreover, the suitability of a given isocyanate to a given application depends upon the compatibility, viscosity, reactivity and functionality of said isocyanate.

The primary objective of this invention is to provide a method for preparing polyfunctional isocyanates with a wide range of viscosities and compatibilities. Another objective of this invention is to provide a method for modifying isocyanates with low functionality into isocyanates with higher functionality. Another object of this invention is to provide a method for preparing tri-and tetrafunctional isocyanate. Another object of this invention is to provide a method for modifying the reactivity of certain isocyanates. Still another object of this invention is to provide a method for reducing the volatility of liquid isocyanates.

I have now found that when totally hydroxypropylated alkylene diamines are chemically reacted with an excess of the stoichiometric quantity of a diisocyanate, or a mixture of a nono- and diisocyanate, the resulting product or mixture of products, which are believed to be a mixture of di- and polyfunctional isocyanates, have many useful and distinctive properties. By this technique, I am able to produce a large number of isocyanate compositions varying in viscosities, compatibilities, reactivities, and functionalities. These compositions have displayed excellent performance over the unmodified isocyanates in a large number of applications.

The reaction of totally hydroxypropylated alkylene diamines with an excess of the stoichiometric quantity of an isocyanate or a mixture of isocyanates generally proceeds readily at room temperature, and can be accomplished by adding the alkylene diamine to the isocyanate or mixture of isocyanates over a period of time with constant agitation. The reaction is normally exothermic and consequently cooling of the reaction mixture is often necessary to keep the reaction temperature below 75° C. in order to avoid side reactions.

Totally hydroxypropylated alkylene diamines are referred to in patent No. 2,697,118 as having the following general structure:

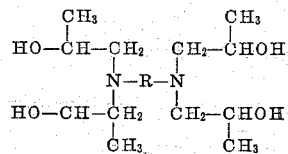

where R is an alkylene radical containing from two to six carbon atoms.

Mono- and diisocyanates that are fluid at room temperature are amenable to modification with totally hydroxypropylated alkylene diamine by direct addition of the totally hydroxypropylated alkylene diamine to the diisocyanate or the mixture of a mono- and diisocyanate. The diisocyanates include alkylene diisocyanates such as hexamethylene diisocyanate, and aromatic diisocyanates such as tolylene-2,4-diisocyanate and tolylene-2,6-diisocyanate.

The monofunctional isocyanates can be either aliphatic such as ethyl isocyanate, or aromatic such as phenyl isocyanate.

If the isocyanate to be modified with a totally hydroxy propylated alkylene diamine which is in the solid state at room temperature, then said isocyanate is first dissolved in a suitable solvent and the reaction carried out in solution. The reaction product or products in this case, however, will be in the form of a solution, and can be utilized only in applications where the presence of solvent is not objectionable. Chlorinated solvents such as dichloroethyl ether have been found suitable for this purpose.

It should be noted that isocyanates that are liquid at room temperatures are also amenable to modification with totally hydroxypropylated alkylene diamines in the form of a solution in a given solvent. Generally, however, this is not a preferred practice since the products of modifications of said isocyanates with totally hydroxypropylated alkylene diamines are often required in a pure form rather than in solution form.

The ratio of a totally hydroxypropylated alkylene diamine to be reacted with a given amount of a given diisocyanate depends primarily upon the properties sought in the end product. However, the quantity of the hydroxypropylated alkylene diamine should not exceed and is preferably less by weight than that of the initial isocyanate reacted therewith. Even very small quantities of hydroxypropylated alkylene diamine, as low as .01% by weight as compared with the isocyanate, have been found to be effective, and a range of .01% to 40% by weight of hydroxypropylated alkylene diamine is desirable. Particularly effective results are obtained with a range of from about 15 to 30 parts by weight of hydroxypropylated alkylene diamine and the remainder isocyanate. The viscosity of the end product is found to increase with an increase in the proportion of hydroxypropylated alkylene diamine. Generally, one mole of the totally hydroxypropylated alkylene diamine such as totally hydroxypropylated ethylene diamine (calculated molecular weight 292.388) when reacted with ten moles of a diisocyanate such as 2,4-tolylene diisocyanate (calculated molecular weight 174.138) yields a product with an intermediate viscosity and reactivity which has been found preferable, in many applications. It has been found, however, that the advantages gained by modifying a diisocyanate with a totally hydroxypropylated alkylene diamine are quite evident even when 150 moles of a diisocyanate are modified with as little as one mole of the totally hydroxypropylated alkylene diamine.

The total sum of the reactions that take place when a totally hydroxypropylated alkylene diamine is reacted with a stoichiometric excess of a diisocyanate are not fully understood. It is believed, however, that the advantages gained by modifying a diisocyanate with a totally hydroxypropylated alkylene diamine are primarily due to the formation of tetrafunctional molecules which, for example, in the case of tolylene-2,4-diisocyanate is thought to assume the following structure:

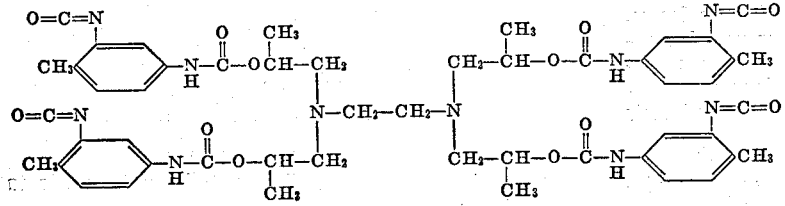

The totally hydroxypropylated alkylene diamine reactant of the aforesaid structural formula is described in Patent No. 2,697,118 as tetra (2 hydroxypropyl) ethylene diamine.

Among the advantages are:
(1) Unique reactivity, e.g. the presence of tertiary amine centers in the molecule impart a catalytic activity upon the reaction of the isocyanate groups with a substrate bearing a reactive hydrogen.
(2) Wide range of viscosities and compatibilities which are a function of the type of alkylene diamine used, the type of diisocyanate or mixture of isocyanates used and the molar ratio of the totally hydroxypropylated alkylene diamine to isocyanate.
(3) Tetrafunctionality is a distinct advantage where high rigidity is required.

The invention will be more readily understood by reference to the accompanying specific examples which are intended as illustrative only rather than as limiting the invention to the specific details set forth therein.

*Example I*

85 parts by weight of 2,4-tolylene diisocyanate are placed in a dry enclosed vessel provided with an agitator and a cooling jacket. 15 parts of totally hydroxypropylated ethylene diamine are added gradually over a period of time with constant agitation and cooling. As a precautionary measure against the highly exothermic heat of the reaction, the temperature throughout is kept below 75° C. After all of the totally hydroxypropylated ethylene diamine has been added, the mixture is agitated for an additional half hour and cooled to room temperature. The product, a straw colored semiviscous liquid is transferred to and stored in dry airtight containers. This solution will from here on be called solution A for brevity.

*Examples II and III*

Instead of tolylene diisocyanate 2,4, the 2,6 isomer may be employed or a mixture of the 2,4 and 2,6 diisocyanates may be employed in the manner described in Example I.

The usefulness of solution A has been tested in the manufacture of polyurethane foams. While tolylene diisocyanate is highly fluid and incompatible with polyfunctional polyesters and polyethers, such as used in polyurethane foams, solution A is quite compatible and can be mixed easily with such polyesters and polyethers. Such polyester and polyether resins are well known in the art and their reaction with various organic isocyanates or isothiocyanates are described for example in Patents Nos. 2,333,639 and 2,292,406. Unsaturated polyesters are preferred and these may be modified by an unsaturated monomer as for example, a vinyl monomer such as styrene.

Moreover, due to the presence of what is believed tetrafunctional isocyanate in solution A, the resulting foams have a decidedly higher rigidity, higher heat distortion point, and higher resistance to shrinkage.

Another use for solution A is as a primer for surface coatings containing active hydrogen atoms.

As an example of such an application, a copolymer of unsaturated polyesters and styrene have very poor adhesion to surfaces when applied as a surface coating. A thin film of solution A is spread over the surface and allowed to dry for two hours at room temperature. Upon applying the above copolymer as a surface coating over such a film, strong adhesion has been observed between the copolymer and the film formed from solution A. Moreover, the latter film is found to adhere strongly to wood, glass, steel and several other types of surfaces.

Solution A represents only one concentration of totally hydroxypropylated ethylene diamine in tolylene diisocyanate. Depending upon the application in question, other concentrations of totally hydroxypropylated ethylene diamine in tolylene diisocyanate can be utilized. Moreover, isocyanates other than tolylene diisocyanate can be used with the result that numerous solutions differing in viscosities and chemical reactivity can be produced.

*Example IV*

The reaction product of 30 parts by weight totally hydroxypropylated ethylene diamine in 70 parts tolylene diisocyanate is quite viscous and may be used in adhesives.

*Example V*

The reaction product of 30 parts by weight totally hydroxypropylated ethylene diamine in 65 parts tolylene diisocyanate and 5 parts of phenylene diisocyanate results in a solution that is less viscous than that in Example IV and differs from solution A in that it contains predominatly tri—rather than tetra—functional isocyanates. The trifunctional compound can be utilized in small quantities in applications where flexibility is important.

*Example VI*

The reaction product of 15 parts by weight totally hydroxypropylated ethylene diamine in 85 parts hexamethylene diisocyanate results in a tetrafunctional isocyanate that is decidedly less reactive than that given in Example I.

In the foregoing examples the mole ratio of isocyanate groups per aliphatic hydroxyl groups is within the range of about 1.81 to 6.24 and this range has been found to give satisfactory results.

The invention has been described in detail for the purpose of illustration but it will be obvious that numerous modifications and variations may be resorted to without departing from the spirit of the invention set forth in the accompanying claims.

What is claimed is:

1. A polyisocyanate containing tertiary amine structure consisting essentially of the reaction product of: (A) an organic diisocyanate selected from a group consisting of hexamethylene diisocyanate, toluylene diisocyanate and phenylene diisocyanate, and (B) tetra (2 hydroxypropyl) ethylene diamine, the mol ratio of isocyanate groups to hydroxyl groups being within the range of about 1.81 to 6.24.

2. The polyisocyanate of claim 1, wherein (A) is hexamethylene diisocyanate.

3. The polyisocyanate of claim 1 wherein (A) is toluylene diisocyanate.

4. The polyiscyanate of claim 1 wherein (A) is phenylene diisocyanate.

References Cited in the file of this patent

UNITED STATES PATENTS

| | | |
|---|---|---|
| 2,284,896 | Hanford et al. | June 2, 1942 |
| 2,585,826 | Olsen | Feb. 12, 1952 |

OTHER REFERENCES

De Bell et al.: "German Plastics Practice," pages 301 and 303 (1946).

Hochtlen: "Kunststoffe," vol. 40, page 226 (July 1950).

Abernathy: "Rubber World," vol. 131 (March 1955), page 766.